United States Patent
Cyr et al.

(10) Patent No.: US 7,031,747 B2
(45) Date of Patent: Apr. 18, 2006

(54) INTERNET PROTOCOL MULTIMEDIA SUBSYSTEM COMPONENT PROVIDING OF PACKET-SWITCHED SWITCHING FUNCTIONS TO SERVING MOBILE SWITCHING CENTER FEATURE SERVER

(75) Inventors: Bernard Louis Cyr, Aurora, IL (US); Richard Paul Ejzak, Wheaton, IL (US); Hong Xie, Downers Grove, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 435 days.

(21) Appl. No.: 10/295,774

(22) Filed: Nov. 14, 2002

(65) Prior Publication Data

US 2004/0204095 A1    Oct. 14, 2004

(51) Int. Cl.
*H04B 1/38*    (2006.01)
(52) U.S. Cl. ............... 455/552.1; 455/560; 455/553.1; 370/352
(58) Field of Classification Search ............ 455/552.1, 455/553.1, 445, 332.1, 433, 560, 550.1; 370/392, 370/461, 352, 338, 349
See application file for complete search history.

(56) References Cited

U.S. PATENT DOCUMENTS

| | | | |
|---|---|---|---|
| 6,611,516 B1 * | 8/2003 | Pirkola et al. ............... | 370/352 |
| 6,775,285 B1 * | 8/2004 | Moles et al. ................ | 370/392 |
| 6,799,223 B1 * | 9/2004 | Yamamoto ................... | 709/250 |
| 2002/0110104 A1 * | 8/2002 | Surdila et al. ............... | 370/338 |
| 2002/0169883 A1 * | 11/2002 | Bright et al. ................ | 709/230 |
| 2003/0026245 A1 * | 2/2003 | Ejzak .......................... | 370/352 |
| 2003/0027569 A1 * | 2/2003 | Ejzak .......................... | 455/432 |
| 2003/0190887 A1 * | 10/2003 | Hook et al. ................. | 455/3.05 |

OTHER PUBLICATIONS

3GPP Organizational Partners; IP Multimedia Subsystem (IMS), Stage 2 (Release 5); ARIB STD-T63-23.228 V5.4.0; http://www.3gpp.org; Mar. 2002; Release 5; 3GPP, 650 Route des Lucioles-Sophia Antipolis Valbonne, France.

"Request for Comments"; http://www.ietf.org/rfc.html; IEFT, 1895 Preston White Drive, Suite 100, Reston, VA 20191-5434, USA; 1pg; Nov. 14, 2002.

"SDP:Session Description Protocol"; http://www.ietf.org/rfc/rfc2327.txt?number=2327; IETF, 1895 Preston White Drive, Suite 100, Reston, VA 20191-5434, USA; 37pgs; Nov. 14, 2002.

(Continued)

*Primary Examiner*—Tilahun Gesesse

(57) ABSTRACT

An apparatus in one example comprises a serving mobile switching center feature server and one or more internet protocol multimedia subsystem components. The serving mobile switching center feature server translates between a call control message originated by or terminated to a mobile telephone and an internet protocol based procedure message. The one or more internet protocol multimedia subsystem components serve to propagate the internet protocol based procedure message. The one or more internet protocol multimedia subsystem components provide packet-switched switching functions to the serving mobile switching center feature server based on the internet protocol based procedure message.

16 Claims, 8 Drawing Sheets

OTHER PUBLICATIONS

"Conventions for the use of the Session Description Protocol (SDP) for ATM Bearer Connections", http://www.ietf.org/rfc/rfc3108.txt?number=3108; IETF, 1895 Preston White Drive, Suite 100, Reston, VA 20191-5434, USA; 97pgs; Nov. 14, 2002.

"An Offer/Answer Model with the Session Description Protocol (SDP)"; http://www.ietf.org/rfc/rfc3264.txt?number=3264; IETF, 1895 Preston White Drive, Suite 100, Reston, VA 20191-5434, USA; 22pgs; Nov. 14, 2002.

"SIP: Session Initiation Protocol"; http://www.ietf.org/rfc/rfc3261.txt?number=3261; IETF, 1895 Preston White Drive, Suite 100, Reston, VA 20191-5434, USA; 236 pgs; Nov. 14, 2002.

* cited by examiner

INTERNET PROTOCOL MULTIMEDIA SUBSYSTEM COMPONENT PROVIDING OF PACKET-SWITCHED SWITCHING FUNCTIONS TO SERVING MOBILE SWITCHING CENTER FEATURE SERVER

CROSS-REFERENCE TO RELATED APPLICATIONS

This application contains subject matter which is related to the subject matter of the following applications, which are assigned to the same assignee as this application. The below-listed applications are hereby incorporated herein by reference in their entireties:

"COMMUNICATION SYSTEM INCLUDING AN INTERWORKING MOBILE SWITCHING CENTER FOR CALL ORIGINATION," by Ejzak, Ser. No. 09/919,651, filed Jul. 31, 2001.

"COMMUNICATION SYSTEM INCLUDING AN INTERWORKING MOBILE SWITCHING CENTER FOR CALL TERMINATION," by Ejzak, Ser. No. 09/919,642, filed Jul. 31, 2001.

"COMMUNICATION SYSTEM FOR PROVIDING ROAMING BETWEEN AN INTERNET PROTOCOL MULTIMEDIA SYSTEM AND A CIRCUIT-SWITCHED DOMAIN," by Ejzak, Ser. No. 09/919,641, filed Jul. 31, 2001.

"PROVISION OF SERVICES IN A COMMUNICATION SYSTEM INCLUDING AN INTERWORKING MOBILE SWITCHING CENTER," by Ejzak, Ser. No. 09/919,675, filed Jul. 31, 2001.

"COMMUNICATION BETWEEN USER AGENTS THROUGH EMPLOYMENT OF CODEC FORMAT UNSUPPORTED BY ONE OF THE USER AGENTS," by Ejzak, et al., co-filed herewith.

"NETWORK CONTROLLER REPLACEMENT OF INDICATION OF ONE OR MORE SPECIFIC NETWORK CONNECTIONS USABLE BY FIRST NETWORK COMPONENT IN SIGNALING MESSAGE FOR SECOND NETWORK COMPONENT WITH WILD CARD NETWORK CONNECTION INFORMATION," by Ejzak, et al., co-filed herewith.

TECHNICAL FIELD

The invention relates generally to communications and more particularly to wireless communications.

BACKGROUND

Current wireless communication systems provide the ability for users to communicate to and from wireless or mobile users. There are generally two types of wireless communication systems, circuit-switched ("CS") and packet-switched ("PS").

In typical circuit-switched wireless communication systems, the mobile switching center ("MSC") connects the landline public switched telephone network ("PSTN") system to the wireless communication system. The mobile switching center is typically split into an mobile switching center server and a media gateway ("MGW"), and incorporates the bearer independent call control ("BICC") or the integrated services digital network user part ("ISUP") call control protocol for call delivery between mobile switching centers.

The current approach to introducing internet protocol ("IP") multimedia services for universal mobile telecommunications service ("UMTS") and code division multiple access ("CDMA") third generation ("3G") systems is to define a brand new internet protocol multimedia subsystem ("IMS"), comprised of a set of internet protocol connected network entities within the internet protocol multimedia subsystem using packet-switched services. These network entities provide internet protocol multimedia features and services using the session initiation protocol ("SIP") as the primary vehicle for call control.

The internet protocol multimedia subsystem shares little in common with the traditional mobile switching center supporting circuit-switched services. Thus new capabilities and services must be defined, developed and deployed twice for systems supporting both circuit-switched and internet protocol multimedia services.

Therefore, a need exists for a communication system that supports features and services for mobile units using either circuit-switched or packet-switched communication systems.

SUMMARY

The invention in one implementation encompasses an apparatus. The apparatus comprises a serving mobile switching center feature server and one or more internet protocol multimedia subsystem components. The serving mobile switching center feature server translates between a call control message originated by or terminated to a mobile telephone and an internet protocol based procedure message. The one or more internet protocol multimedia subsystem components serve to propagate the internet protocol based procedure message. The one or more internet protocol multimedia subsystem components provide packet-switched switching functions to the serving mobile switching center feature server based on the internet protocol based procedure message.

Another implementation of the invention encompasses a method. A mobile switching center is selected that comprises mobile switching center feature services and circuit-switched switching services. A portion of the circuit-switched switching functions is replaced with one or more internet protocol multimedia subsystem components that support packet-switched switching functions. Internet protocol based procedure messages are employed to communicatively couple the one or more internet protocol multimedia subsystem components with the mobile switching center feature services.

Yet another implementation of the invention encompasses an article. The article comprises one or more computer-readable signal-bearing media. The article comprises means in the one or more media for selecting a mobile switching center that comprises mobile switching center feature services and circuit-switched switching services. The article comprises means in the one or more media for replacing a portion of the circuit-switched switching functions with one or more internet protocol multimedia subsystem components that support packet-switched switching functions. The article comprises means in the one or more media for employing internet protocol based procedure messages to communicatively couple the one or more internet protocol multimedia subsystem components with the mobile switching center feature services.

DESCRIPTION OF THE DRAWINGS

Features of exemplary implementations of the invention will become apparent from the description, the claims, and the accompanying drawings in which:

DETAILED DESCRIPTION

Figure 1:
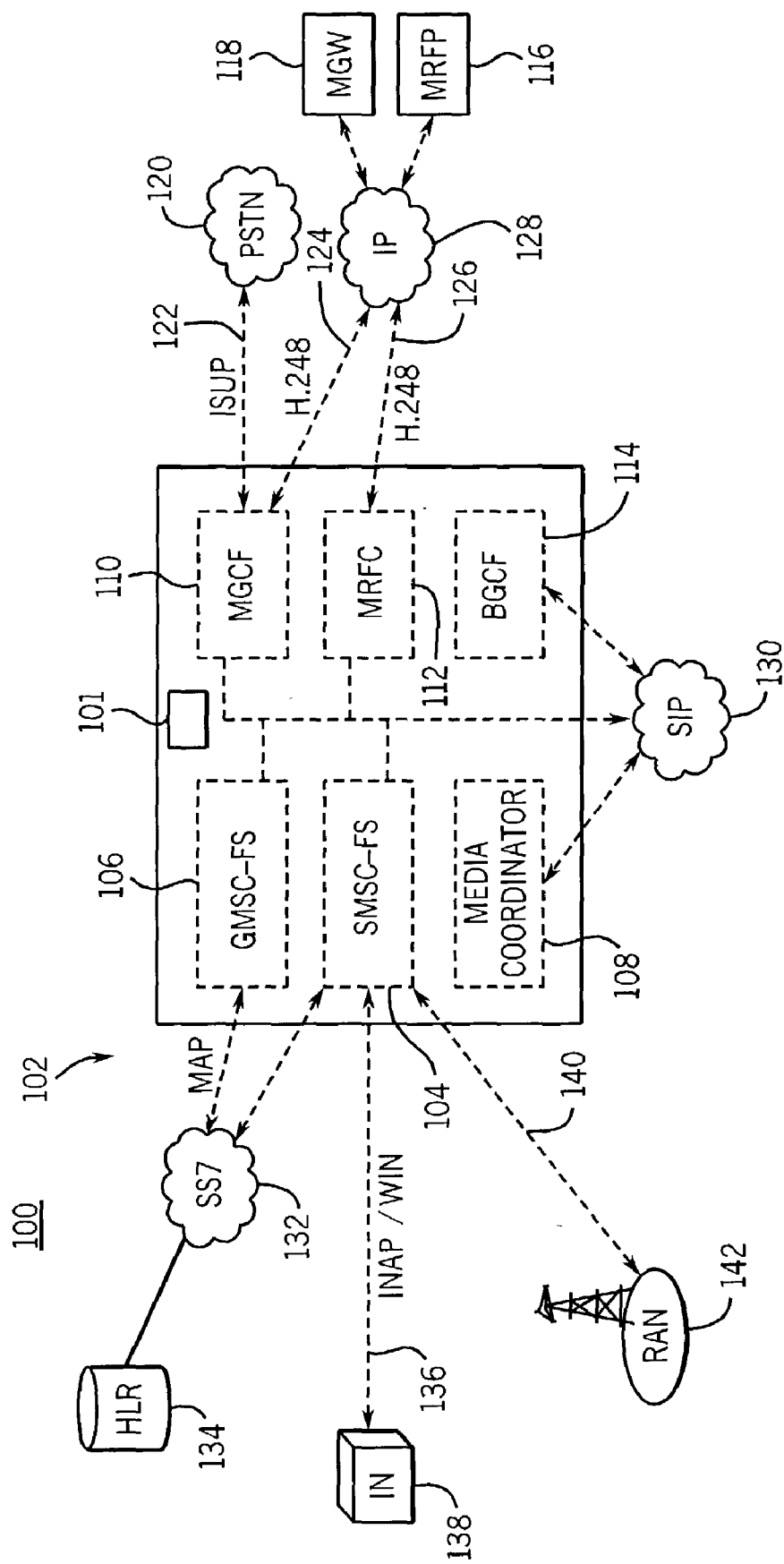
FIG. 1 is a representation of one example of an apparatus that comprises one or more mobile switching center service components and one or more internet protocol multimedia subsystem components.

Turning to FIG. 1, an apparatus 100 in one example comprises a plurality of components such as computer software and/or hardware components. A number of such components can be combined or divided in the apparatus 100.

In one example, the apparatus 100 employs one or more computer-readable signal-bearing media. One example of a computer-readable signal-bearing medium for the apparatus 100 comprises an instance of a recordable data storage medium 101 such as one or more of a magnetic, electrical, optical, biological, and atomic data storage medium. In another example, a computer-readable signal-bearing medium for the apparatus 100 comprises a modulated carrier signal transmitted over a network comprising or coupled with the apparatus 100, for instance, one or more of a telephone network, a local area network ("LAN"), the internet, and a wireless network. An exemplary component of the apparatus 100 employs and/or comprises a set and/or series of computer instructions written in or implemented with any of a number of programming languages, as will be appreciated by those skilled in the art.

In one example, the apparatus 100 comprises a mobile switching center ("MSC") 102. The mobile switching center 102 comprises one or more mobile switching center service components and one or more internet protocol multimedia subsystem ("IMS") components. The one or more internet protocol multimedia subsystem components provide a packet-switched switching function to the one or more mobile switching center service components. The one or more internet protocol multimedia subsystem components provide session initiation protocol ("SIP") based call signaling, call routing, signaling interworking, and media processing services to the one or more mobile switching center service components. The one or more mobile switching center service components and the one or more internet protocol multimedia subsystem components comprise a network for communication between endpoints. A wireless portion of the network may communicate via a cellular system protocol, for example, code division multiple access ("CDMA"), global system for mobile communications ("GSM"), or universal mobile telecommunications system ("UMTS"). The one or more mobile switching center service components and the one or more internet protocol multimedia subsystem components may be within the same mobile switching center 102 or distributed between a plurality of instances of the mobile switching center 102.

The one or more mobile switching center service components comprise a serving mobile switching center feature server ("SMSC-FS") 104, a gateway mobile switching center feature server ("GMSC-FS") 106, and a media coordinator ("MC") 108. The one or more internet protocol multimedia subsystem components comprise a media gateway control function ("MGCF") 110, a media resource function controller ("MRFC") 112, a breakout gateway control function ("BGCF") 114, a media resource function processor ("MRFP") 116, and a media gateway ("MGW") 118.

The serving mobile switching center feature server 104 provides the mobile switching center 102 with functions of a serving mobile switching center with the exception of the functions provided by the one or more internet protocol multimedia subsystem components and the media coordinator 108. The serving mobile switching center feature server 104 supports mobility management, subscriber feature control, call-related supplementary services, originating intelligent network ("IN") triggers, digit analysis, emergency service, charging, and media coordinator interface.

In one example, the serving mobile switching center feature server 104 comprises a session initiation protocol user agent ("UA"). The serving mobile switching center feature server 104 supports session initiation protocol call control procedures. The session initiation protocol call control procedures comprise session initiation protocol based call signaling, call routing, signaling interworking, and media processing. Additional instances of the serving mobile switching center feature server 104 may support other call control protocols such as bearer independent call control ("BICC") or integrated services digital network user part ("ISUP"). The mobile switching center 102 may employ the additional instances of the serving mobile switching center feature server 104 to support a plurality of call control protocols.

The serving mobile switching center feature server 104 provides interworking between internal origination and termination call features and services, and an external session initiation protocol interface to the media coordinator 108. The external session initiation protocol interface supports communication of mobile-originated and mobile-terminated calls between the serving mobile switching center feature server 104 and the remainder of the network. The external session initiation protocol interface also supports communication of media requests for tones, announcements, or conferencing between the serving mobile switching center feature server 104 and the media coordinator 108. The communication of media requests between the serving mobile switching center feature server 104 and the media coordinator 108 requires the definition of additional session initiation protocol headers or attachments in some cases. Unlike the session initiation protocol interfaces between other entities in the mobile switching center 102, the external session initiation protocol interface between the serving mobile switching center feature server 104 and the media coordinator 108 will typically remain private to a single vendor, allowing the use of private session initiation protocol extensions using the X-header mechanism defined by the internet engineering task force ("IETF").

The gateway mobile switching center feature server 106 provides the mobile switching center 102 with services of a gateway mobile switching center through session initiation protocol call control procedures. In one example, the gateway mobile switching center feature server 106 comprises a session initiation protocol back-to-back user agent ("B2BUA"). The gateway mobile switching center feature server 106 supports session initiation protocol call control procedures. Additional instances of the gateway mobile switching center feature server 106 may support other call control protocols such as bearer independent call control or integrated services digital network user part. The mobile switching center 102 may employ the additional instances of the gateway mobile switching center feature server 106 to support a plurality of call control protocols.

The gateway mobile switching center feature server 106 supports terminating services, basic intersystem call delivery, terminating intelligent network triggers, secondary treatment, and charging. In one example, the gateway mobile switching center feature server 106 delivers call progress or service control indications to the calling party as out-of-band call progress information using session initiation protocol. The originating point in the network (i.e., the serving mobile switching center feature server 104, the media coordinator 108, or the media gateway control function 110) converts the out-of-band call progress information to in-band call progress information. The call progress and service control indications are typically carried via existing session initiation protocol messages and headers, although additional session initiation protocol headers or attachments may be needed in some cases.

In one example, the media coordinator 108 comprises a session initiation protocol back-to-back user agent between the serving mobile switching center feature server 104 and the network. For mobile telephone originated calls, the media coordinator 108 supports propagation of basic call state information between the serving mobile switching center feature server 104 and the network. The media coordinator 108 supports conversion of out-of-band call progress or call-release information from the network to in-band call progress information toward the mobile telephone by allocation of resources of the media resource function controller 112 and the media resource function processor 116. The media coordinator 108 supports media negotiation between end-points in the network through allocation of resources of the media resource function controller 112 and the media resource function processor 116 as needed for media conversion. The media coordinator 108 supports control of forward cut-through of media when call is answered within the network. The media coordinator 108 supports session initiation protocol third party call control procedures to perform media functions under direction of the serving mobile switching center feature server 104. The media functions comprise allocation of resources of the media resource function controller 112 and the media resource function processor 116 as needed to control conferencing, tones, announcements, or inter-system handoff.

For calls terminated at the mobile telephone, the media coordinator 108 supports propagation of basic call state information between the serving mobile switching center feature server 104 and the network. The media coordinator 108 supports media negotiation between end-points in the network through allocation of resources of the media resource function controller 112 and the media resource function processor 116 as needed for media conversion. The media coordinator 108 supports session initiation protocol third party call control procedures to perform media functions under direction of the serving mobile switching center feature server 104. The media functions include allocation of resources of the media resource function controller 112 and the media resource function processor 116 as needed to control conferencing, tones, announcements, or inter-system handoff.

The media gateway control function 110 serves as a call control interface and translator between the mobile switching center 102 and a public switched telephone network ("PSTN") 120 or another network. In one example, the media gateway control function 110 comprises a session initiation protocol user agent ("UA") for the mobile switching center 102. For example, the media gateway control function 110 converts between session initiation protocol call control messages of the mobile switching center 102 and bearer independent call control or integrated services digital network user part call control messages of the public switched telephone network 120. The media gateway control function 110 communicates with the public switched telephone network 120 via a communication link, for example, a bearer independent call control or integrated services digital network user part interface 122.

In one example, the media gateway control function 110 controls the media gateway 118. The media gateway control function 110 comprises a signaling layer controller and the media gateway 118 comprises a media layer controller. The media gateway control function 110 provides connection control for media channels in the media layer controlled by the media gateway 118. The media gateway control function 110 controls the media gateway 118 via a communication link, for example, a H.248 interface 124 through an internet protocol network 128.

In another example, the media gateway control function 110 controls a plurality of the media gateways 118. The media gateway control function 110 controls the plurality of media gateways 118 via one or more communication links, for example, one or more instances of the H.248 interface 124 to the internet protocol network 128. The plurality of the media gateways 118 register with the media gateway control function 110. After registration with the media gateway control function 110 the plurality of media gateways 118 can begin bearer processing. The media gateway control function 110 controls establishment of bearer resources for communications that require inter-working between the mobile switching center 102 and the public switched telephone network 120. The media gateway control function 110 requests allocation of ports for communications that require services of the media gateway 118.

The media gateway control function 110 uses the H.248 interface 124 to the internet protocol network 128 to signal the media gateway 118 to execute one or more media operations. The one or more media operations comprise registration of the media gateway 118, bearer establishment control between the mobile switching center 102 and the public switched telephone network 120, request for allocation of media translation resources (i.e., compression, echo cancellation, and vocoding), control of events detected at the media gateway 118, application of tones and announcements, and collection of statistics.

The media gateway control function 110 uses a session initiation protocol network 130 to accept commands from other signaling entities in the network. The media gateway control function 110 performs functions related to control of a call. The media gateway control function 110 provides for negotiation of media attributes with other end-points in the network. For calls originating in the public switched telephone network 120 and entering the mobile switching center 102, the media gateway control function 110 provides for conversion of out-of-band call progress information into in-band call progress information. The out-of-band call progress information comprises a signaling message that is not heard by a user during communication. The in-band call progress information comprises a signaling message that is heard by the user during communication. For example, the media gateway control function 110 provides for conversion of an out-of-band ringing indication to an in-band ringing tone. In another example, the media gateway control function 110 provides for conversion of an out-of-band network error indication (i.e., a session initiation protocol server internal error response message) to an in-band network error signal (i.e., a fast busy indication).

The media resource function controller 112 provides control of packet-based media services (i.e., advanced announcement generation and detection), conferencing, tone and announcement generation, future advanced media services (i.e., video mixing), transcoding, and interactive voice response. The media resource function controller 112 controls the media resource function processor 116 via a communication link, for example, a H.248 interface 126 through the internet protocol network 128. By controlling the media resource function processor 116, the media resource function controller 112 controls use of vocoders, transcoders, compression entities, bearer-stream mixers, and echo cancellers. The vocoders are needed to transcode between media streams using different media encoding formats (e.g. selectable mode vocoder "SMV", enhanced variable rate codec "EVRC", and G.711). The media resource function controller 112 supports real time protocol, user datagram protocol, and internet protocol ("RTP/UDP/IP") as a transport protocol stack for packet media.

The breakout gateway control function 114 comprises a signaling entity for call/session control. In one example, the breakout gateway control function 114 comprises a session initiation protocol proxy server for the mobile switching center 102. In another example, the breakout gateway control function 114 comprises a session initiation protocol redirect server or session initiation protocol back-to-back user agent. The breakout gateway control function 114 selects the media gateway control function 110 to couple the mobile switching center 102 with the public switched telephone network 120. A call from a wireless telephone to a telephone in the public switched telephone network 120 comprises a signaling message. The signaling message comprises connection information of an address (i.e., an E.164 address) of the telephone in the public switched telephone network 120. The breakout gateway control function 114 employs the E.164 address to locate an internet protocol network destination address of the call. In one example, the breakout gateway control function 114 references an address translation table to find the internet protocol network destination address corresponding to the E.164 address. The address translation table may include other information needed to establish communication between the breakout gateway control function 114 and the next hop destination for the signaling message, including port number, transport protocol, and security parameters. The breakout gateway control function 114 sends the signaling message to the destination address.

The breakout gateway control function 114 may use information from a plurality of sources to determine the destination address. The plurality of sources comprise the point of origination of the call within the network, location of the E.164 address, local policies and business agreements between the visited and home networks, desire to minimize path distance within the public switched telephone network 120 network, and a desire for the least-cost path.

The breakout gateway control function 114 performs selection of the media gateway control function 110 based on the destination address, hiding of network information from other networks, and provision of security through authorization of peer network elements. When a first breakout gateway control function 114 exists in a first network, a second breakout gateway control function 114 exists in a second network, and the networks are coupled, then the first and the second breakout gateway control functions 114 may hide local network information from the other network.

The media gateway 118 translates between a media flow (e.g., audio) on a given internet protocol network and bearer data on the public switched telephone network 120. The media gateway 118 terminates circuit-switched ("CS") bearer traffic from the public switched telephone network 120 and terminates internet protocol media flow as packet streams from another end-point in the mobile switching center 102. In one example, other end-point comprises the media gateway control function 110 or a media end-point associated with the serving mobile switching center feature server 104. The media gateway 118 performs vocoding and provides tones and announcements. The media gateway 118 comprises resources to modify a bearer stream (i.e., encoding, compression, echo cancellation, packetization, transcoding, packet timing synchronization, and packet loss handling).

The media gateway 118 supports one or more types of voice encoding (i.e., codec formats). The one or more types of voice encoding comprise G.711, enhanced variable-rate codec ("EVRC"), adaptive multi-rate ("AMR"). The media gateway 118 is able to use the G.711 codec format to encode and decode voice on trunks connected to the public switched telephone network 120.

The media gateway 118 comprises resources to support a plurality of signaling mechanisms, for example, registration with the media gateway control function 110, detection of events (e.g., dual-tone multi-frequency ("DTMF") detection), application of tones and announcements to bearer streams, graceful teardown and random restart, notification, generation of statistics, and support of H.248 packages. The media gateway 118 organizes bearer connections using H.248 contexts containing terminations. The media gateway 118 may include numerous simultaneous contexts.

The mobile switching center 102 comprises one or more interfaces with communication support entities in the network external to the mobile switching center 102. The mobile switching center 102 comprises a signaling system seven ("SS7") interface 132 to a home location register ("HLR") 134. The home location register 134 comprises a database that stores registration information for a user of the network. The mobile switching center 102 comprises an intelligent network application protocol ("INAP") or wireless intelligent network ("WIN") interface 136 to an intelligent network ("IN") 138. The intelligent network 138 provides the mobile switching center 102 access to one or more telephony services, for example, number translation, local number portability ("LNP"), call forwarding, call screening, and wireless integration. The mobile switching center 102 comprises an interface 140 to an radio access network ("RAN") 142. The radio access network 142 comprises an interface between the mobile telephone and the network (i.e., the mobile switching center 102). The radio access network 142 may comprise a code division multiple access radio access network, a universal mobile telecommunications system terrestrial radio access network ("UTRAN"), or a global system for mobile communications/enhanced data rates for global evolution radio access network ("GERAN"). The radio access network 142 is coupled to the mobile telephone via an air interface, for example, a third generation ("3G") air interface. The radio access network 142 may employ an instance of the media gateway 118 to convert the air interface media flow into a packet stream.

Figure 2:
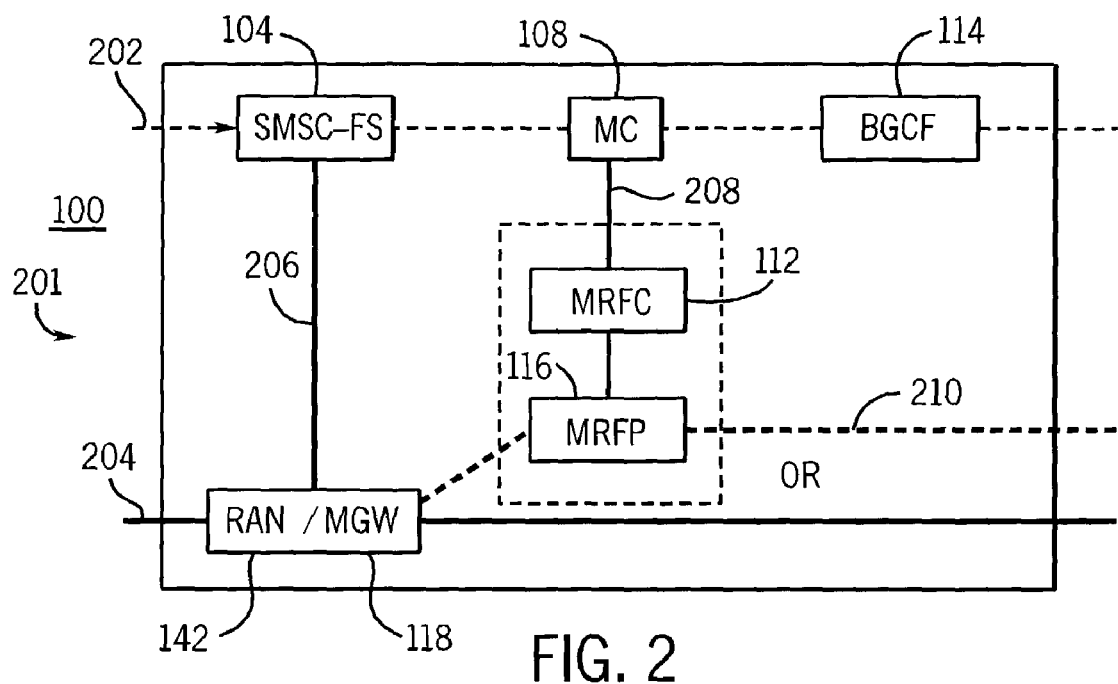
FIG. 2 is a representation of one exemplary configuration of the apparatus of FIG. 1 that serves to handle a call originated by a mobile telephone.

Turning to FIG. 2, exemplary configuration 201 of the mobile switching center 102 serves to handle a call originated by a mobile telephone. The mobile switching center 102 comprises a signaling path 202 and a media path 204. To initiate communication, the mobile telephone sends a call origination message on the signaling path 202 to the serving mobile switching center feature server 104. The serving mobile switching center feature server 104 employs the call origination message on the signaling path 202 to control media flow in the radio access network 142/media gateway 118 on the media path 204. The serving mobile switching center feature server 104 controls the radio access network 142/media gateway 118 via a communication link, for example, a H.248 interface 206. The serving mobile switching center feature server 104 converts the call origination message to a session initiation protocol message.

The serving mobile switching center feature server 104 sends the session initiation protocol message to the media coordinator 108. The media coordinator 108 employs one or more characteristics of the session initiation protocol message and subsequent signaling messages to determine whether to signal the media resource function controller 112 to allocate resources of the media resource function processor 116. For example, if the media on the media path 204 needs to be translated between media formats, then the media coordinator 108 will generate a second session initiation protocol message. The media coordinator 108 will send the second session initiation protocol message to the media resource function controller 112 on a session initiation protocol interface 208. The media resource function controller 112 will allocate the media resource function processor 116 to translate the media on the media path 204 of a first format into media of a second format. The media resource function processor 116 outputs the media of the second format on a second media path 210.

The media coordinator 108 sends the session initiation protocol message to the breakout gateway control function 114. The session initiation protocol message comprises an address (i.e., an E.164 address) of a recipient of the call. The breakout gateway control function 114 employs the E.164 address to locate a destination address of the call. In one example, the breakout gateway control function 114 references an address translation table to find the destination address corresponding to the E.164 address. The breakout gateway control function 114 sends the session initiation protocol message to the destination address on the signaling path 202.

Figure 3:
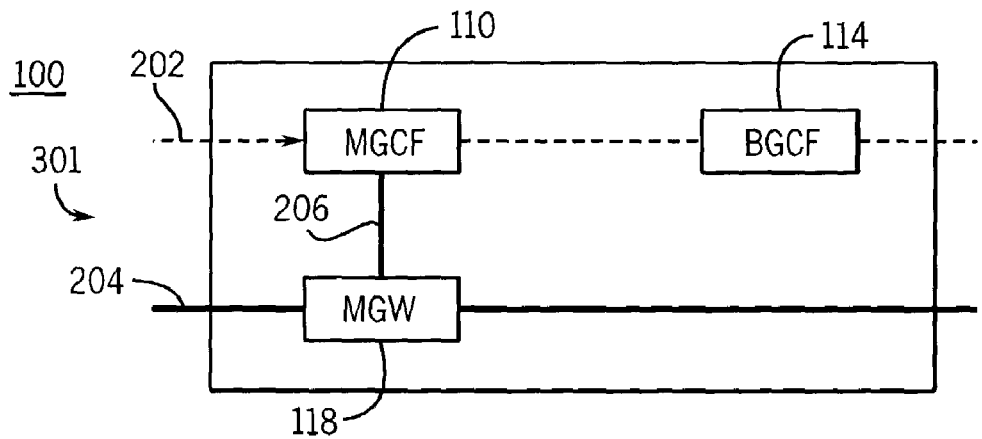
FIG. 3 is a representation of one exemplary configuration of the apparatus of FIG. 1 that serves to handle a call originated from a public switched telephone network.

Turning to FIG. 3, exemplary configuration 301 of the mobile switching center 102 serves to handle a call originated from the public switched telephone network 120. The mobile switching center 102 comprises the signaling path 202 and the media path 204. To initiate communication, the public switched telephone network 120 sends a call origination message on the signaling path 202 to the media gateway control function 110. The media gateway control function 110 controls the media gateway 118 on the media path 204 via the H.248 interface 206. The media gateway 118 converts a time division multiplexing ("TDM") media trunk into packet bearer media over the real time protocol, user datagram protocol, and internet protocol transport protocol stack. The media gateway control function 110 converts the call origination message to a session initiation protocol message. The media gateway control function 110 sends the session initiation protocol message to the breakout gateway control function 114. The breakout gateway control function 114 locates the destination address of the call analogous to configuration 201. The breakout gateway control function 114 sends the session initiation protocol message to the destination address on the signaling path 202.

Figure 4:
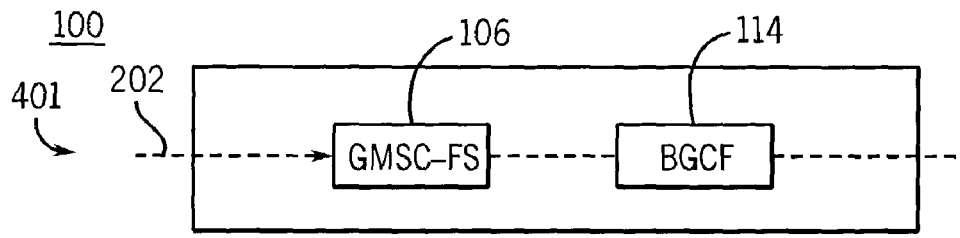
FIG. 4 is a representation of one exemplary configuration of the apparatus of FIG. 1 that serves to handle an intermediate signal flow.

Turning to FIGS. 1 and 4, exemplary configuration 401 of the mobile switching center 102 serves to handle an intermediate signal flow. The configuration 401 receives the session initiation protocol message to the destination address on the signaling path 202. In one example, the destination address corresponds to the mobile telephone and the session initiation protocol message does not know which instance of the serving mobile switching center feature server 104 serves the mobile telephone. The gateway mobile switching center feature server 106 receives the destination address in the session initiation protocol message.

The home location register 134 comprises registration and location information of the mobile telephone. The gateway mobile switching center feature server 106 contacts the home location register 134 via the signaling system seven interface 132 to request the temporary local directory number ("TLDN") of the destination address. The home location register 134 contacts the instance of the serving mobile switching center feature server 104 that serves the mobile telephone corresponding to the destination address to request the temporary local directory number of the destination address. The serving mobile switching center feature server 104 sends the temporary local directory number to the home location register 134. The home location register 134 sends the temporary local directory number to the gateway mobile switching center feature server 106.

The gateway mobile switching center feature server 106 modifies the destination address in the session initiation protocol message to correspond to the temporary local directory number. The gateway mobile switching center feature server 106 sends the session initiation protocol message to the breakout gateway control function 114. The breakout gateway control function 114 locates the destination address of the call analogous to configuration 201. The breakout gateway control function 114 sends the session initiation protocol message to the destination address on the signaling path 202.

Figure 5:
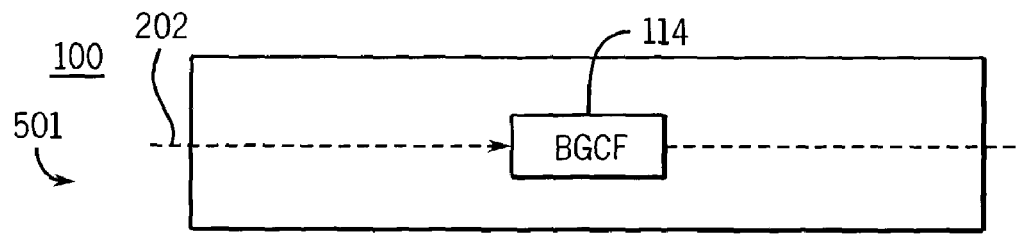
FIG. 5 is a representation of another exemplary configuration of the apparatus of FIG. 1 that serves to handle an intermediate signal flow.

Turning to FIGS. 1 and 5, exemplary configuration 501 of the mobile switching center 102 serves to handle an intermediate signal flow. The configuration 501 receives the session initiation protocol message on the signaling path 202. In one example, the destination address corresponds to the public switched telephone network 120 and the session initiation protocol message does not know which instance of the media gateway control function 110 serves the destination address on the public switched telephone network 120. The breakout gateway control function 114 receives the destination address in the session initiation protocol message. The breakout gateway control function 114 updates the destination address in the session initiation protocol message analogous to configuration 201. The breakout-gateway control function 114 sends the session initiation protocol message to the updated destination address on the signaling path 202.

Figure 6:
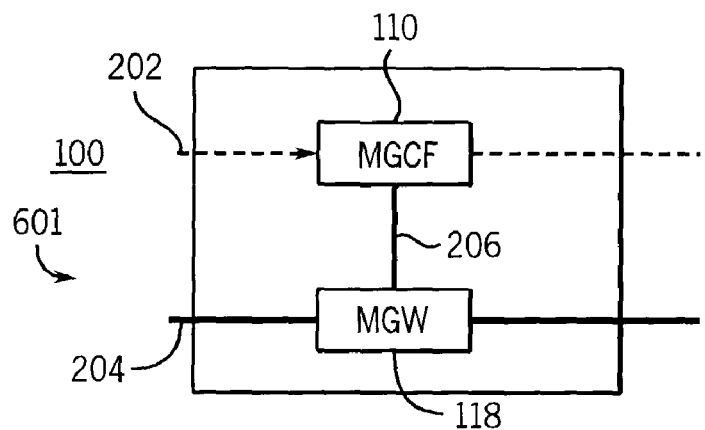
FIG. 6 is a representation of one exemplary configuration of the apparatus of FIG. 1 that serves to handle a call terminated at a public switched telephone network.

Turning to FIG. 6, exemplary configuration 601 of the mobile switching center 102 serves to handle a call terminated at the public switched telephone network 120. The mobile switching center 102 comprises the signaling path 202 and the media path 204. The media gateway control function 110 receives the session initiation protocol message to the destination address on the signaling path 202. The media gateway control function 110 controls the media gateway 118 on the media path 204 via the H.248 interface 206. The media gateway 118 converts packet bearer media over the real time protocol, user datagram protocol, and internet protocol transport protocol stack into a time division multiplexing media trunk. The media gateway control function 110 converts the session initiation protocol message into a bearer independent call control or an integrated services digital network user part call control message. The media gateway control function 110 sends the bearer independent call control or the integrated services digital network user part call control message to the public switched telephone network 120.

Figure 7:
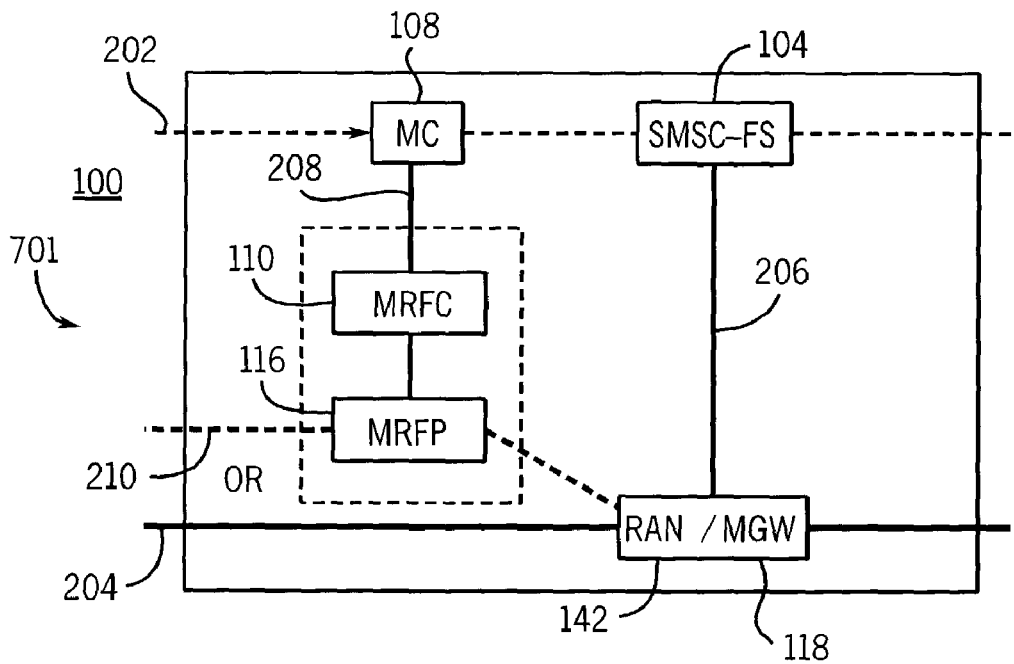
FIG. 7 is a representation of one exemplary configuration of the apparatus of FIG. 1 that serves to handle a call terminated at a mobile telephone.

Turning to FIG. 7, exemplary configuration 701 of the mobile switching center 102 serves to handle a call terminated at a mobile telephone. The mobile switching center 102 comprises the signaling path 202 and the media path 204. The media coordinator 108 receives the session initiation protocol procedure message to the destination address on the signaling path 202. The media coordinator 108 controls optional allocation of resources of the media resource function processor 116 via the session initiation protocol interface 208. For example, allocation of a translator to convert media over the real time protocol, user datagram protocol, and internet protocol transport protocol stack to media in a packet stream. The media resource function processor 116 sends the packet stream to the radio access network 142/media gateway 118 on the media path 204. The serving mobile switching center feature server 104 controls the radio access network 142/media gateway 118 via a communication link, for example, a H.248 interface 206. The radio access network 142/media gateway 118 sends the packet stream to the mobile telephone. The media coordinator 108 sends the session initiation protocol procedure message to the serving mobile switching center feature server 104. The serving mobile switching center feature server 104 converts the session initiation protocol procedure message to a call control message specific to the mobile telephone. The serving mobile switching center feature server 104 sends the call control message to the mobile telephone.

Figure 8:
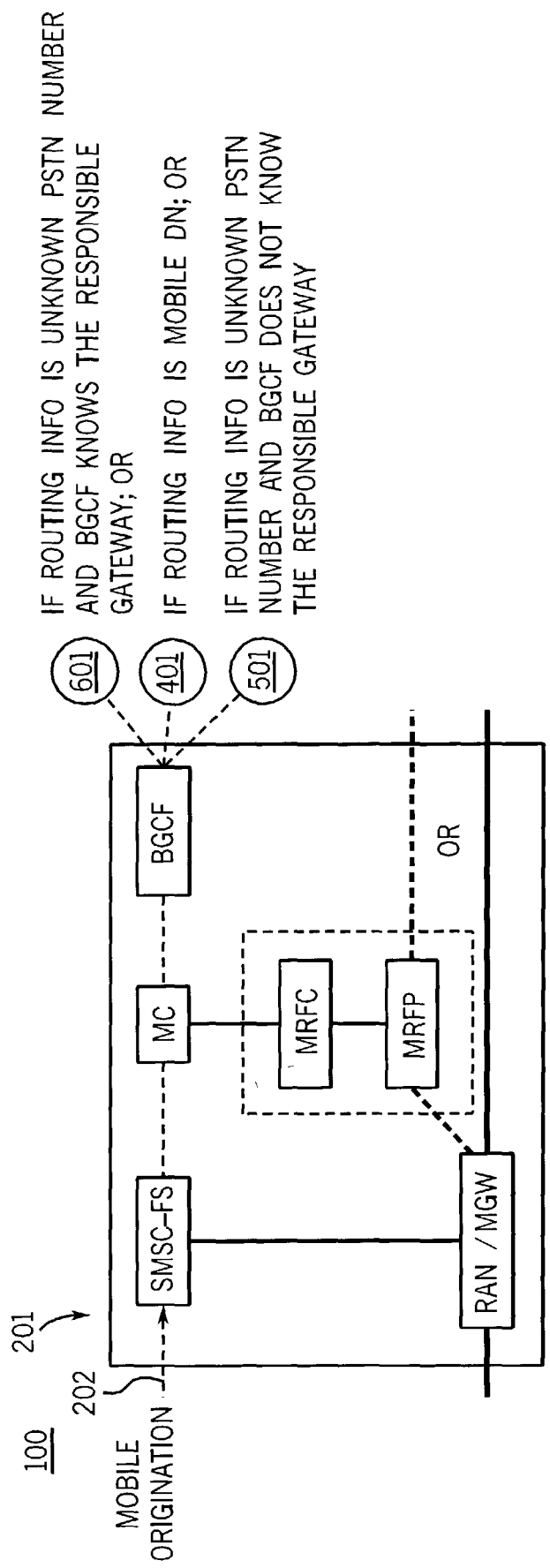
FIG. 8 is another representation of one exemplary configuration of the apparatus of FIG. 1 that serves to handle a call originated by a mobile telephone.

Turning to FIGS. 1 and 8, the configuration 201 serves to allow the mobile switching center 102 to handle a call originated by a mobile telephone. To initiate communication, the mobile telephone sends a call origination message on the signaling path 202 to the configuration 201. The configuration 201 generates a session initiation protocol message and determines a destination address for the session initiation protocol message as described above.

In one example, the destination address corresponds to a second mobile telephone, and the configuration 201 does not know which instance of the serving mobile switching center feature server 104 serves the second mobile telephone. Therefore, the configuration 201 sends the session initiation protocol message to the configuration 401 to attempt to locate the instance of the serving mobile switching center feature server 104 that serves the second mobile telephone.

In another example, the destination address corresponds to an endpoint in the public switched telephone network 120, and the configuration 201 does not know which instance of the media gateway control function 110 serves the endpoint. Therefore, the configuration 201 sends the session initiation protocol message to the configuration 501 to attempt to locate the instance of the media gateway control function 110 that serves the endpoint.

In yet another example, the destination address corresponds to an endpoint in the public switched telephone network 120, and the configuration 201 knows which instance of the media gateway control function 110 serves the endpoint. Therefore, the configuration 201 sends the session initiation protocol message to the configuration 601 corresponding to the instance of the media gateway control function 110 that serves the endpoint.

Figure 9:
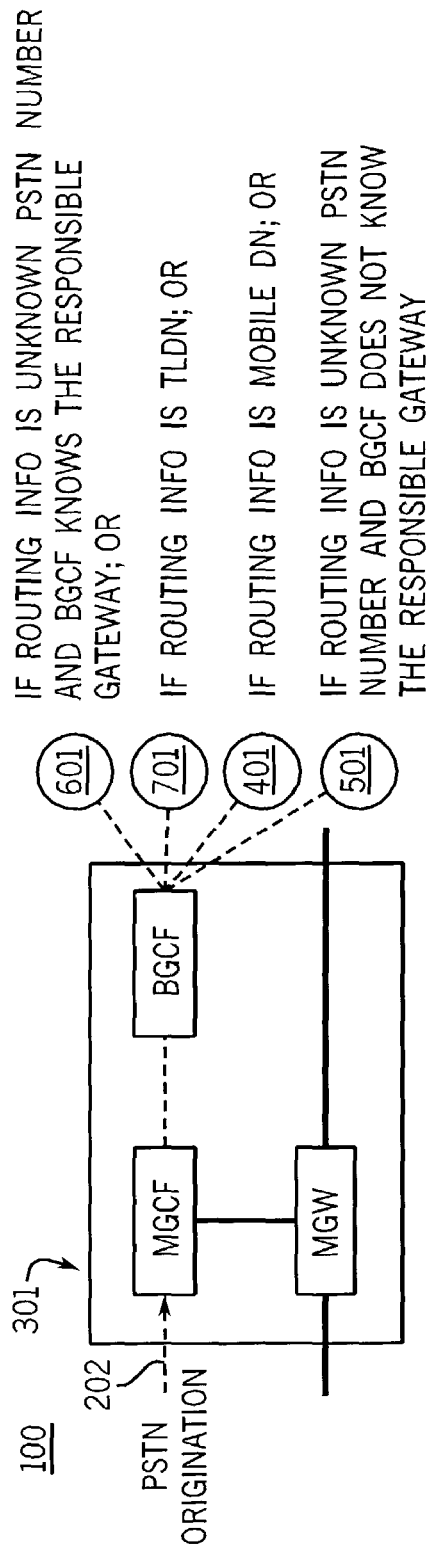
FIG. 9 is another representation of one exemplary configuration of the apparatus of FIG. 1 that serves to handle a call originated from a public switched telephone network.

Turning to FIGS. 1 and 9, the configuration 301 serves to allow the mobile switching center 102 to handle a call originated from the public switched telephone network 120. To initiate communication, the public switched telephone network 120 sends a call origination message on the signaling path 202 to the configuration 301. The configuration 301 generates a session initiation protocol message and determines a destination address for the session initiation protocol message as described above.

The configuration 301 determines to send the session initiation protocol message to one of the configurations 401, 501, and 601 using the same criteria as the configuration 201 described above. However, one difference between the configurations 201 and 301 is in the situation when the destination address corresponds to the temporary local directory number of a mobile telephone. The configuration 301 sends the session initiation protocol message to the corresponding instance of the configuration 701 that serves the mobile telephone.

Figure 10:
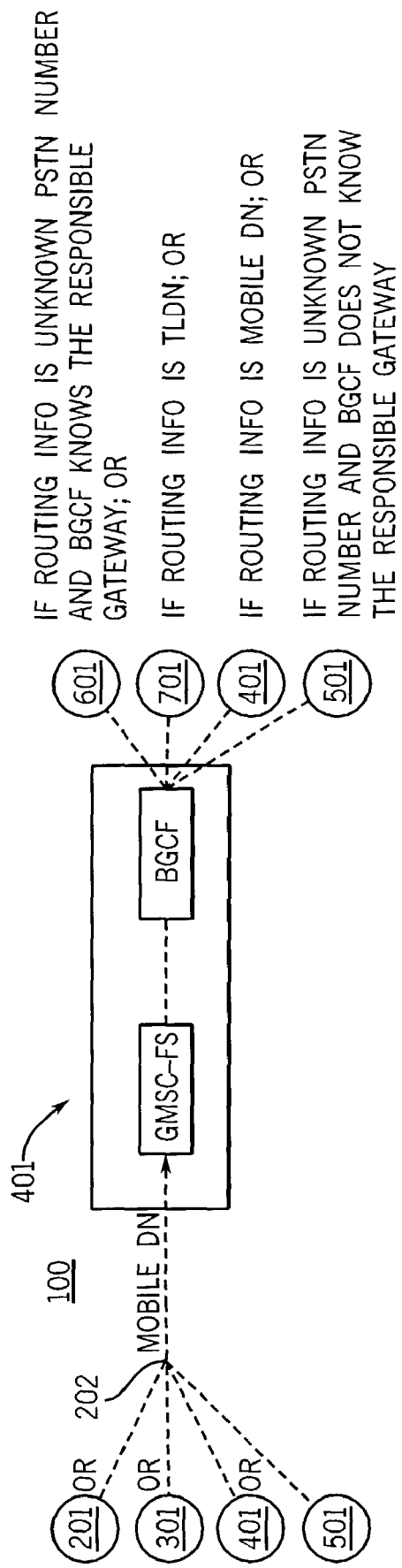
FIG. 10 is another representation of one exemplary configuration of the apparatus of FIG. 1 that serves to handle an intermediate signal flow.

Turning to FIGS. 1 and 10, the configuration 401 serves to allow the mobile switching center 102 to handle an intermediate signal flow. The configuration 401 receives a session initiation protocol message on the signaling path 202 from an instance of one of the configurations 201, 301, 401, and 501. The configuration 401 determines a destination address for the session initiation protocol message as described above. The configuration 401 determines to send the session initiation protocol message to one of the configurations 401, 501, 601, and 701 using the same criteria as the configuration 301 described above.

Figure 11:
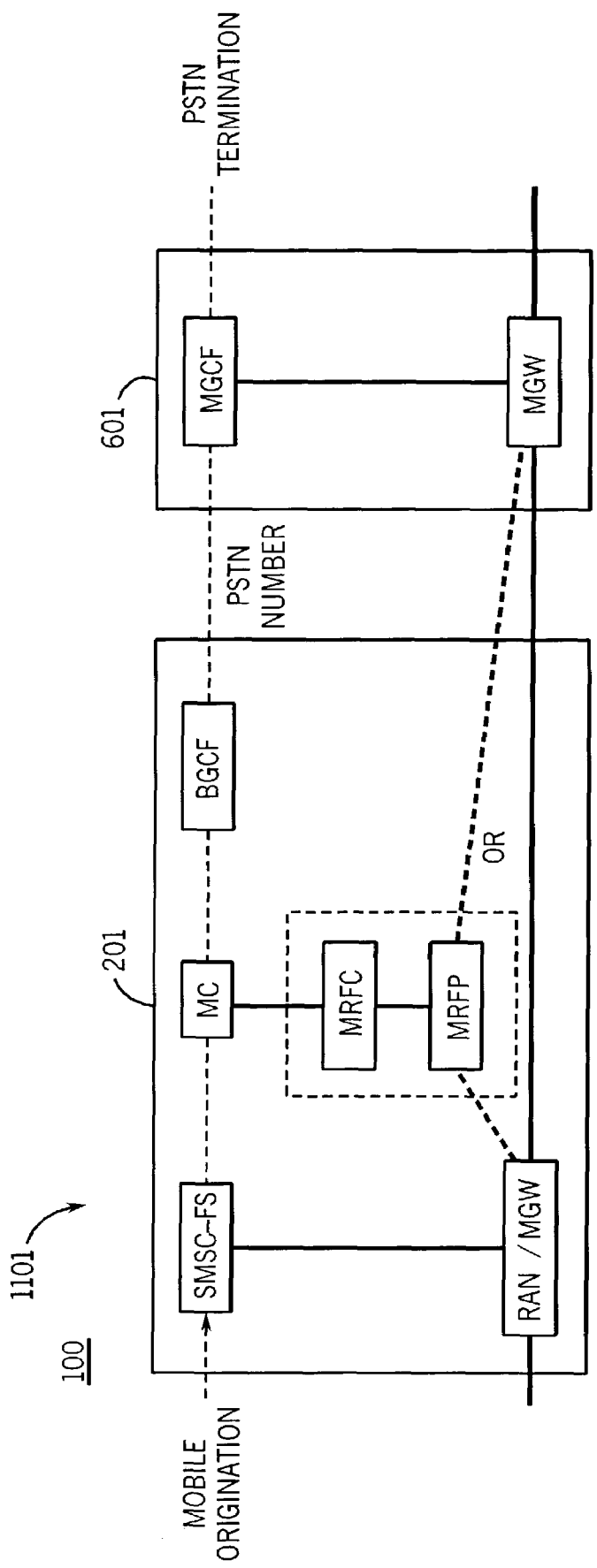
FIG. 11 is a representation of one exemplary configuration of the apparatus of FIG. 1 that serves to handle a call originated by a mobile telephone and terminated at a public switched telephone network.

Turning to FIGS. 1 and 11, exemplary configuration 1101 of the mobile switching center 102 serves to handle a call originated by a mobile telephone and terminated at the public switched telephone network 120. The mobile telephone sends a call origination message to an instance of configuration 201. The instance of configuration 201 generates a session initiation protocol message based on the call origination message. The instance of configuration 201 sends the session initiation protocol message to an instance of configuration 601. The instance of configuration 601 generates a bearer independent call control or an integrated services digital network user part call control message based on the session initiation protocol message. The instance of configuration 601 sends the bearer independent call control or the integrated services digital network user part call control message to the public switched telephone network 120.

Figure 12:
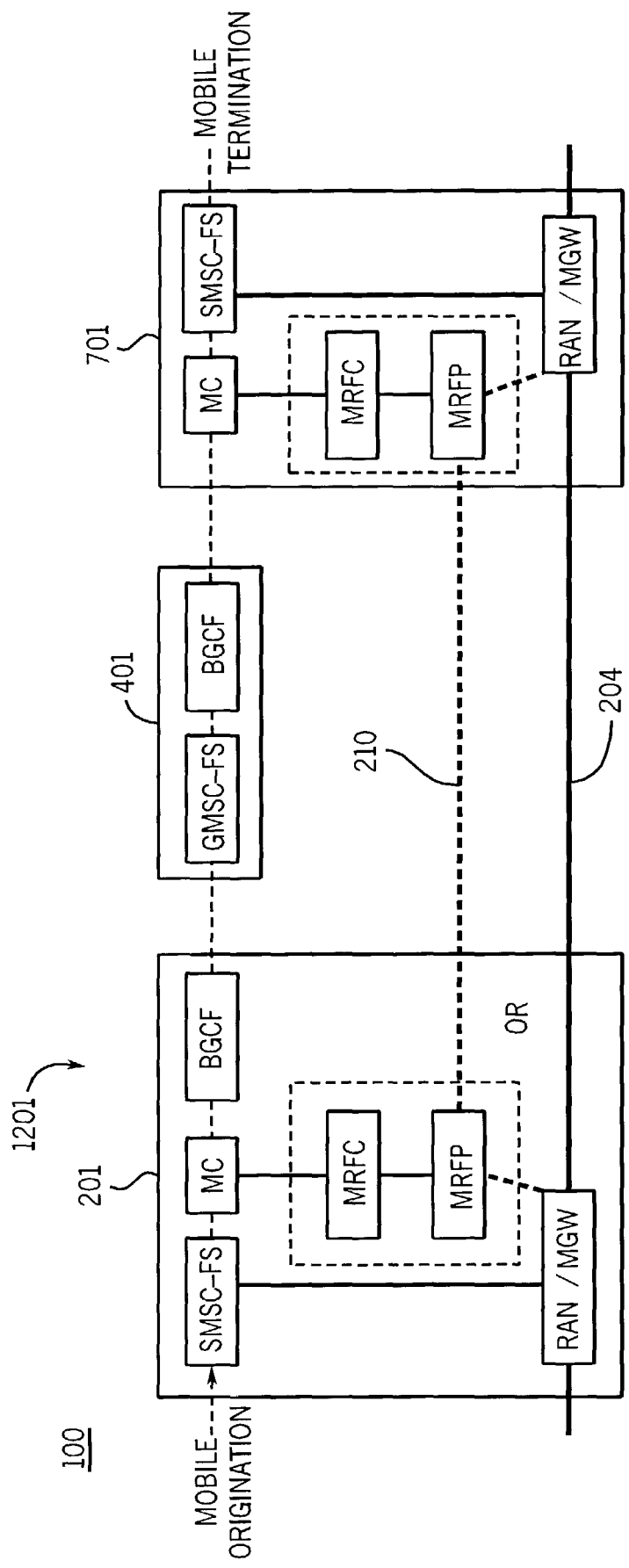
FIG. 12 is a representation of one exemplary configuration of the apparatus of FIG. 1 that serves to handle a call originated by a first mobile telephone and terminated at a second mobile telephone.

Turning to FIGS. 1 and 12, exemplary configuration 1201 of the mobile switching center 102 serves to handle a call originated by a first mobile telephone and terminated at a second mobile telephone. The mobile telephone sends a call origination message to an instance of configuration 201. The instance of configuration 201 generates a session initiation protocol message based on the call origination message. The instance of configuration 201 sends the session initiation protocol message to an instance of configuration 401. The instance of configuration 401 determines an instance of configuration 701 that serves the second mobile telephone. The instance of configuration 401 sends the session initiation protocol message to the instance of configuration 701 that serves the second mobile telephone. The instance of configuration 701 generates a call origination message based on the session initiation protocol message. The instance of configuration 701 sends the call origination message to the second mobile telephone. The media paths 204 and 210 between the configurations 201 and 701 are interchangeable. Since the configurations 201 and 701 allocate instances of the media resource function processor 116 independently, there may be zero, one or more instances of the media resource function processors 116 involved in the media flow.

Figure 13:
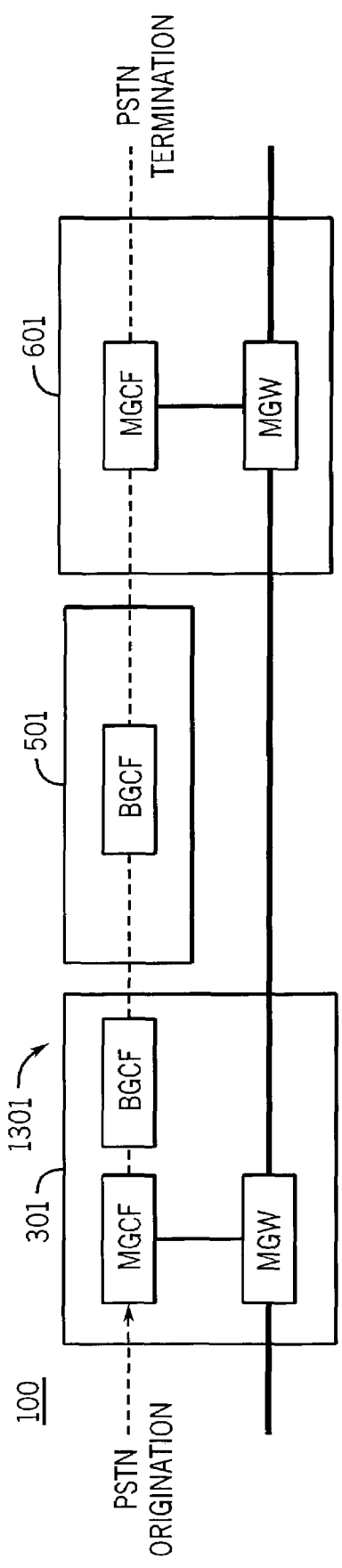
FIG. 13 is a representation of one exemplary configuration of the apparatus of FIG. 1 that serves to handle a call originated by a public switched telephone network and terminated at the public switched telephone network.

Turning to FIGS. 1 and 13, exemplary configuration 1301 of the mobile switching center 102 serves to handle a call originated by the public switched telephone network 120 and terminated at the public switched telephone network 120. The public switched telephone network 120 sends a call origination message to an instance of configuration 301. The instance of configuration 301 generates a session initiation protocol message based on the call origination message. The instance of configuration 301 sends the session initiation protocol message to an instance of configuration 501. The instance of configuration 501 determines an instance of configuration 601 that serves the public switched telephone network 120 receiving the call. The instance of configuration 501 sends the session initiation protocol message to the instance of configuration 601. The instance of configuration 601 generates a bearer independent call control or an integrated services digital network user part call control message based on the session initiation protocol message. The instance of configuration 601 sends the bearer independent call control or the integrated services digital network user part call control message to the public switched telephone network 120 receiving the call.

Figure 14:
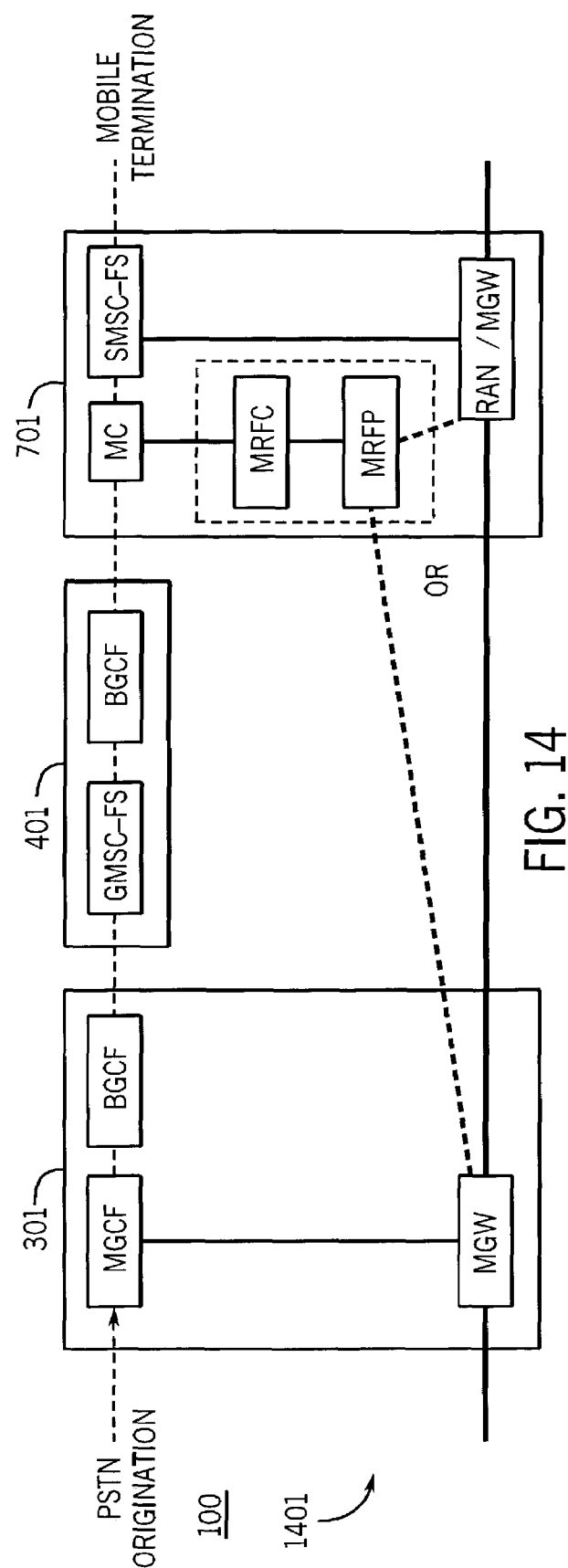
FIG. 14 is a representation of one exemplary configuration of the apparatus of FIG. 1 that serves to handle a call originated by a public switched telephone network and terminated at a mobile telephone.

Turning to FIGS. 1 and 14, exemplary configuration 1401 of the mobile switching center 102 serves to handle a call originated by the public switched telephone network 120 and terminated at a mobile telephone. The public switched telephone network 120 sends a call origination message to an instance of configuration 301. The instance of configuration 301 generates a session initiation protocol message based on the call origination message. The instance of configuration 301 sends the session initiation protocol message to an instance of configuration 401. The instance of configuration 401 locates an instance of configuration 701 that serves the mobile telephone. The instance of configuration 401 sends the session initiation protocol message to the instance of configuration 701. The instance of configuration 701 generates call origination message based on the session initiation protocol message. The instance of configuration 701 sends the call origination message to the mobile telephone.

The steps or operations described herein are just exemplary. There may be many variations to these steps or operations without departing from the spirit of the invention. For instance, the steps may be performed in a differing order, or steps may be added, deleted, or modified.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

We claim:

1. An apparatus, comprising:
a serving mobile switching center feature server that translates between a call control message originated by or terminated to a mobile telephone and an internet protocol based procedure message; and
an internet protocol multimedia subsystem component that serves to propagate the internet protocol based procedure message;
wherein the internet protocol multimedia subsystem component provides packet-switched switching functions to the serving mobile switching center feature server based on the internet protocol based procedure message;
wherein the call control message comprises a call setup message to initiate a call, wherein the mobile telephone sends the call setup message to the serving mobile switching center feature server on a signaling path;
wherein the serving mobile switching center feature server supports a media path to carry a communication associated with the call;
a media coordinator, wherein the serving mobile switching center feature server sends the internet protocol based procedure message to the media coordinator;
wherein the media coordinator determines based on the internet protocol based procedure message whether the communication on the media path requires translation;
wherein the internet protocol multimedia subsystem component comprises a break out gateway control function;
wherein the media coordinator sends the internet protocol based procedure message to the break out gateway control function;
wherein the internet protocol based procedure message comprises a telephone number of a recipient of the call, wherein the break out gateway control function converts the telephone number of the recipient to connection information of an address to send the internet protocol based procedure message;
a gateway mobile switching center feature server, wherein the gateway mobile switching center feature server contacts a home location register to retrieve a temporary local directory number of the recipient of the call;
wherein the internet protocol multimedia subsystem component comprises a media gateway control function that translates between a call control message originated by or terminated to a public switched telephone network and the internet protocol based procedure message;

wherein the break out gateway control function comprises a first break out gateway control function, wherein based on the connection information of the address the first break out gateway control function sends the internet protcol based procedure message to any of a second break out gateway control function, an instance of the media gateway control function, and an instance of the gateway mobile switching center feature server.

2. The apparatus of claim 1, wherein the internet protcol based procedure message comprises a session initiation protocol message and session initiation protocol procedures;

wherein the session initiation protocol messages comprises a session initiation protocol invite messages and session initiation protocol response messages.

3. The apparatus of claim 1, wherein the internet protocol multimedia subsystem component comprises a media resource function controller and a media resource function processor;

wherein if the media coordinator determines the communication on the media path requires translation the media coordinator signals the media resource function controller to translate the communication;

wherein the media resource function controller allocates translation resources of the media resource function processor on the media path.

4. The apparatus of claim 1, wberein the mobile telephone comprises a first mobile telephone, wherein based on the connection information of the address the first break out gateway control function sends the internet protocol based procedure message to:

the instance of the media gateway control function if the address corresponds to the public switched telephone network and the first break out gateway control function is associated with the instance of the media gateway control function;

the second break out gateway control function if the address corresponds to the public switched telephone network and the first break out gateway control function is unassociated with the instance of the media gateway control function; or the instance of the gateway mobile switching center feature server if the address corresponds to a second mobile telephone.

5. The apparatus of claim 1 further comprising a gateway mobile switching center feature server, wherein the gateway mobile switching center feature server comprises an interface to a home location register for the one or more internet protocol multimedia subsystem components.

6. The apparatus of claim 1 further comprising a media coordinator, wherein the media controller controls media functions for the serving mobile switching center feature server.

7. The apparatus of claim 6, wherein the internet protocol multimedia subsystem component comprises a media resource function controller;

wherein the media resource function controller comprises an interface to the media functions for the media coordinator.

8. The apparatus of claim 1, wherein the internet protocol multimedia subsystem component comprises a media resource function processor;

wherein the media resource function processor comprises media functions for the serving mobile switching center feature server, wherein the media functions comprise media translation.

9. The apparatus of claim 1, wherein the internet protocol multimedia subsystem component comprises a media gateway control function, wherein the media gateway control function comprises an interface to a public switched telephone network or another network for the serving mobile switching center feature server.

10. The apparatus of claim 1, wherein the internet protocol multimedia subsystem component comprises a media gateway control function and a break out gateway control function;

wherein the break out gateway control function comprises an interface to the media gateway control function for the serving mobile switching center feature server.

11. The apparatus of claim 1, wherein the internet protocol multimedia subsystem component comprises a media gateway, wherein the media gateway comprises a media translator to modify a communication between a public switched telephone network and an internet protocol based network for the serving mobile switching center feature server.

12. The apparatus of claim 1, wherein the serving mobile switching center feature server and the internet protocol multimedia subsystem component comprise a first mobile switching center, wherein the first mobile switching center employs session initiation protocol messages to communicate with a second mobile switching center.

13. The apparatus of claim 1, wherein the packet-switched switching functions comprise any one of session initiation protocol based call signaling, call routing, signaling interworking, and media processing.

14. A method, comprising the steps of:

selecting a mobile switching center that comprises mobile switching center feature services and circuit-switched switching services;

replacing a portion of the circuit-switched switching functions with one or more internet protocol multimedia subsystem components that support packet-switched switching functions;

employing internet protocol based procedure messages to communicatively couple the one or more internet protocol multimedia subsystem components with the mobile switching center feature services employing a call control message that includes a call setup message to initiate a call, transmitting the call setup message from a mobile telephone to a serving mobile switching center feature server on a signaling path;

the serving mobile switching center feature server supports a media path to carry a communication associated with the call;

the serving mobile switching center feature server sending the internet protocol based procedure message to a media coordinator that determines based on the internet protocol based procedure message whether the communication on the media path requires translation;

the internet protocol multimedia subsystem components comprising a break out gateway control function where the internet protocol based procedure message is sent to the break out gateway control function;

the internet protocol based procedure message comprising a telephone number of a recipient of the call, wherein the break out gateway control function converts the telephone number of the recipient to connection information of an address to send the internet protocol based procedure message;

contacting a home location register by a gateway mobile switching center feature server to retrieve a temporary local directory number of the recipient of the call;

translating between a call control message originated by or terminated to a public switched telephone network and the internet protocol based procedure message by a media gateway control function implemented by the internet protocol multimedia subsystem components;

the break out gateway control function comprising a first break out gateway control function, wherein based on the connection information of the address the first break out gateway control function sends the internet protocol based procedure message to any of a second break out gateway control function, an instance of the media gateway control function, and an instance of the gateway mobile switching center feature server.

15. The method of claim 14, wherein the step of replacing the portion of the circuit-switched switching functions with the one or more internet protocol multimedia subsystem components that support packet-switched switching functions comprises the steps of:

delegating the one or more internet protocol multimedia subsystem components to handle switching functions; and retaining a portion of the mobile switching center to handle the mobile switching center feature services.

16. The method of claim 14, wherein the step of employing the internet protocol based procedure messages to communicatively couple the internet protocol multimedia subsystem component and the mobile switching center feature services comprise the step of:

directing the internet protocol multimedia subsystem component to handle media translations by sending the internet protocol based procedure messages by the mobile switching center feature services.

* * * * *